United States Patent [19]

Childress

[11] Patent Number: 5,800,300
[45] Date of Patent: Sep. 1, 1998

[54] MOTION TRANSFER DEVICE

[76] Inventor: Ellen Childress, 105 Green St., Reading, Mass. 01867

[21] Appl. No.: 814,797

[22] Filed: Mar. 10, 1997

Related U.S. Application Data

[63] Continuation of Ser. No. 489,022, Jun. 8, 1995, Pat. No. 5,651,745.
[51] Int. Cl.[6] ............................................. F16H 55/48
[52] U.S. Cl. ........................... 474/190; 446/409; 446/457
[58] Field of Search .................................. 474/190, 166, 474/167, 204, 205, 273; 446/233, 409, 457

[56] References Cited

U.S. PATENT DOCUMENTS

| | | | |
|---|---|---|---|
| 3,032,345 | 5/1962 | Lemelson | 273/95 |
| 3,143,895 | 8/1964 | Robie | 74/229 |
| 4,627,828 | 12/1986 | Nagai et al. | 474/205 |
| 5,322,479 | 6/1994 | Le Devehat | 474/101 |
| 5,378,522 | 1/1995 | Lagomarsino | 24/442 X |
| 5,385,472 | 1/1995 | Mullin | 434/134 |
| 5,439,408 | 8/1995 | Wilkinson | 466/409 |

OTHER PUBLICATIONS

"Lots O Gears" Childcraft Toys Internat'l Ltd. 1 page, undated.

*Primary Examiner*—Roger J. Schoeppel
*Attorney, Agent, or Firm*—Sharon L. Day

[57] ABSTRACT

A device for exploring the transferring of motion from one body to another body which utilizes a motion transfer surface is presented. The device is a hollow structure for receiving an object which has a motion transfer surface on its exterior. The hollow structure may be a tube or a polygon, such as for example a pyramid. The hollow structure can be opened and closed so that the object can be secured therein. Preferably, the object is spherical. Further, the object may have a gyroscope seated within its interior. The gyroscope may be activated by waves having a frequency, such as for example sound waves or electronic waves. Further objects, each having a motion transfer surface may also be seated within the hollow structure. Preferably where two or more objects are present, each object has a motion transfer surface and is in frictional contact with another object. Additionally, a toothed ribbon suitable for use as a motion transfer surface is described.

17 Claims, 8 Drawing Sheets

MOTION TRANSFER DEVICE

This application is a continuation of Ser. No. 08/489,022, filed on Jun. 8, 1998, now U.S. Pat. No. 5,651,745.

FIELD OF THE INVENTION

This invention relates to both a structure and a method for exploration of motion transfer which utilizes a hooked nap and a looped nap of a two part separable fastener system.

BACKGROUND

Separable fasteners or closure mechanisms which utilize a nap formed from hooked or "male" member to engage a nap formed from a looped or "female" member when pressure is applied are known. Commonly, a flexible substrate such as a tape or ribbon is provided with loop-like structures to form a looped nap and an opposing flexible substrate is provided with hook-like structuresto form a hooked nap on its surface. Usually a nap is formed only on one surface of the substrate, the surface which will form a closure. The opposing surface typically remains relatively smooth or at least nap-less. When one substrate nap is pressed against another, a closure or holding means results. To separate one tape from the other, force is applied perpendicularly to the napped surface of one or more of the substrates, thus "peeling" one from the other. This type of separable fastener is known by its trademarked name, VELCRO, which is claimed in U.S. Pat. No. 3,009,235 to G. De Mestral. Modifications and variations on this type of fastener which differ from one another in ease and economy of production as well as in such properties such as the amount of force required to separate male from female napped substrates are claimed in U.S. Pat. Nos. 3,708,833 to Ribich; 3,147,528 to Erb; 3,762,000 to Menzin et al.; 4,872,243 to Fischer; 4,984,339 to Provost et al.; 5,131,119 to Ryuichi Murasaki et al.; and 5,339,499 to Kennedy, et al.

Separable VELCRO fasteners or closures have been used on mechanisms for transferring motion albeit as separable fasteners. U.S. Pat. No. 4,596,540 to F'Geppert claims a power-transmission belt of a V-type which has a hooked nap on one end and a looped nap on the opposite end. If the belt which is in place breaks, it can be replaced by this belt which is size adjusted to fit tautly by pressing together the napped ends when the desired tension is achieved. While the belt itself is utilized to transfer motion, the napped separable fastener is not itself so utilized.

Separable VELCRO fasteners have also been used as a means for attaching objects for construction toys. U.S. Pat. No. 5,385,472 to Smith et al., shows an educational toy which demonstrates the conversion of hydraulic power into motion. Herein, separable VELCRO napped fasteners are used to maintain toy components such as water wheel in a vertical position. When water is directed into the buckets of the water wheel, the wheel is caused to rotate. However, the VELCRO fasteners are not directly involved in the transfer of motion.

In another example of a construction toy known as *Lots of Gears* which was sold by CHILDCRAFT TOYS INTERNATIONAL, LTD., Jerusalem, gears having varying sizes and pivotal axes are provided with VELCRO fasteners having a hooked nap on one side at the pivot point. A board which covered with a looped napped VELCRO fastener is provided for mounting the gears so that different gear ratios may be demonstrated when gears of varying sizes are engaged with one another. Again, the separable VELCRO napped fastener components are used for mounting rather than for motion transfer.

Separable VELCRO fastener components have been used in toys to cause motion to cease. For example, it is known to cover a glove or a portion of a glove for catching a tennis ball with separable VELCRO fasteners. When the ball is tossed either straight up into the air or from one player to another such that the VELCRO fastener on the glove contacts the VELCRO fastener on the ball, the ball and glove "stick" one to the other under certain conditions. Thus, the motion of the ball is curtailed. However, motion is not transmitted to a second body which is thereby caused to move in this example.

BRIEF SUMMARY OF THE INVENTION

A structure and a method for exploration of motion transfer from one body to another through the use of hook-like, male and loop-like, female component-bearing surfaces or so called "naps" are provided. Further, this invention provides an educational toy for recycling bottle caps which is useful for demonstrating the physical science principles involved in motion transfer. Additionally, a unique drive mechanism having at least two degrees of freedom is provided.

More particularly, skirted bottle caps such as are used on certain brands of bottled, liquid detergent are recycled as an educational building and motion transfer set by the use of a motion transfer substrate, connecting tubes, and pivot sources. The motion transfer substrate can either have a tooth-like ridges or a hook-like napped component which can engage a loop-like napped component. The tooth-like substrate can be used to form gears. Surprisingly, the hook-like napped component and loop-like napped component can also be used for making gear-like structures called fritches which form paired engagements and transfer motion from a drive body to a driven body. The hook-like napped component and loop-like napped component can be used to form fritches, cams, construction elements, and belts.

In the simplest embodiment, a gear-like structure (also called a round- or R-fritch) is formed by providing a pivoted cylindrical structure with a surface comprised of a napped or toothed component arranged around its perimeter, for example, in a band. When a loop-like, female napped component is applied, a LR-fritch is formed. When a hook-like, male napped component is applied, a HR-fritch is formed. If a combination of loop-like and hook-like naps are applied or if the napped areas are interrupted by relatively smooth areas, a VR-fritch is formed. Application of toothed substrate to a form results in the formation of a toothed shape such as a toothed cap or a toothed sphere. If both toothed and napped substrates are present, then the fritch is a TLR-fritch, where a loop-like napped substrate is applied to a shape such a cap or a THR-fritch, where a hook-like napped structure is applied to a cap.

When two R-fritches of opposite types are provided, for example a first LR-fritch and a second HR-fritch, and placed so as to engage one another, then when the LR-fritch is rotated, the HR-fritch also rotates. In order for some movement to be transferred, at least some of the points of contact between the first and the second fritch must be of an opposite type. However, it should be noted that not all points of contact need be of opposite types. When a fritch fritch and a second fritch have napped surfaces of the same type, frictional forces may also result in motional transfer.

In a second embodiment, a continuous belt-like structure (or a ribbon-like structure which through a closure means can be made into a belt) having at least one napped structure (or so called fritch area) of a hooked type on a surface for engaging a napped structure of a loop type on a fritch such as an R-fritch, is held tautly in place by two fritches, for example LR-fritches. Each fritch has napped areas of a type opposite those on the fritch engaging surface of the belt. When either a fritch or the belt is caused to move in either direction, the remaining components of the system are also caused to move or rotate.

In a third embodiment, a method and a device for slowing the transfer of motion are provided. For example, a LR-fritch is placed on either side of a belt or ribbon having hook-like napped areas on each side. The placement of the LR-fritches is such that their L-fritch areas engage the H-fritch areas on the belt. Note that fritched areas of opposing types are used. Further, the hook napped and loop napped system chosen should require a large amount of force for separation. Thus, when a weight is attached to the belt and the belt is caused to be engaged on each side by a LR-fritch, the descent of the weight due to gravity is slowed.

In a fourth embodiment, a means and a device having more than two degrees of rotational freedom are provided. A first, hollow, spherical structure is provided with fritch areas on its outer surface thus forming an S-fritch. Two additional S-fritches, fritch two and fritch three, having at least some fritch areas of a type opposite that of the first S-fritch are made to engage the first S-fritch. When the first fritch is rotated, fritch two and fritch three are made to rotate when fritch areas of opposite types engagingly contact each other.

Further, an S-fritch may have an activateable gyroscope within its hollow spherical structure. The S-fritch may be placed in a tube or other three dimensional structure with one or more additional balls which may or may not also have activateable gyroscopes therein. Also, a plurality of S-fritches may be arranged in the shape of a polygon, i.e. a pyramid or in a sphere. Activation of one or more S-fritch spheres would affect the direction motion of the remaining spheres. This is an example of a motion transfer which has more than two degrees of rotational freedom.

In another embodiment, modular building structures may have fritch areas for connecting the structures either to each other or to other types of fritches.

One of the many objects of this invention is to provide an educational and industrially useful method and device for transferring motion between two or more bodies.

Another object of this invention is to provide a visually stimulating educational toy for demonstrating the physical principles involved in motion transfer.

It is also an object of this invention to provide a kit for recycling bottle caps which are made from materials which otherwise would be taken to landfills.

DETAILED DESCRIPTION OF THE EMBODIMENTS.

Fritches are defined as moveable bodies having relatively rigid forms and at least one motion transfer surface which has a hook-like nap or loop-like nap. The hook-like nap surfaces are herein referred to as opposite in type to the loop-like napped surfaces and vice versa. Collectively, hook or loop napped areas are termed fritched areas. Examples of suitable such surfaces are shown in U.S. Pat. Nos. 2,717,437 to De Mestral; 3,009,235 to De Mestral; U.S. Pat. Nos. 3,708,833 to Ribich; 3,147,528 to Erb; 3,762,000 to Menzin et al.; 4,872,243 to Fischer; 4,984,339 to Provost et al.; 5,131,119 to Ryuichi Murasaki et al.; and 5,339,499 to Kennedy, et al., each of which is incorporated herein by reference.

Figure 1:
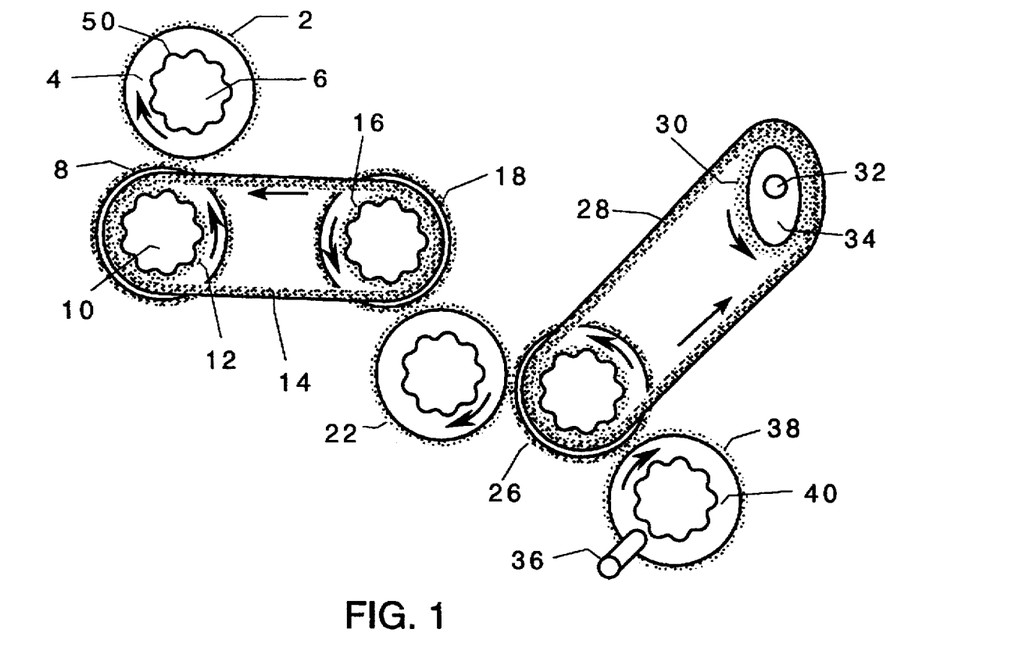
FIG. 1 depicts a top view of R-fritches engaging R-fritches which are engaging a belt having fritch areas and an R-fritch and a cam fritch engaging a belt having fritch areas.
Figure 2:
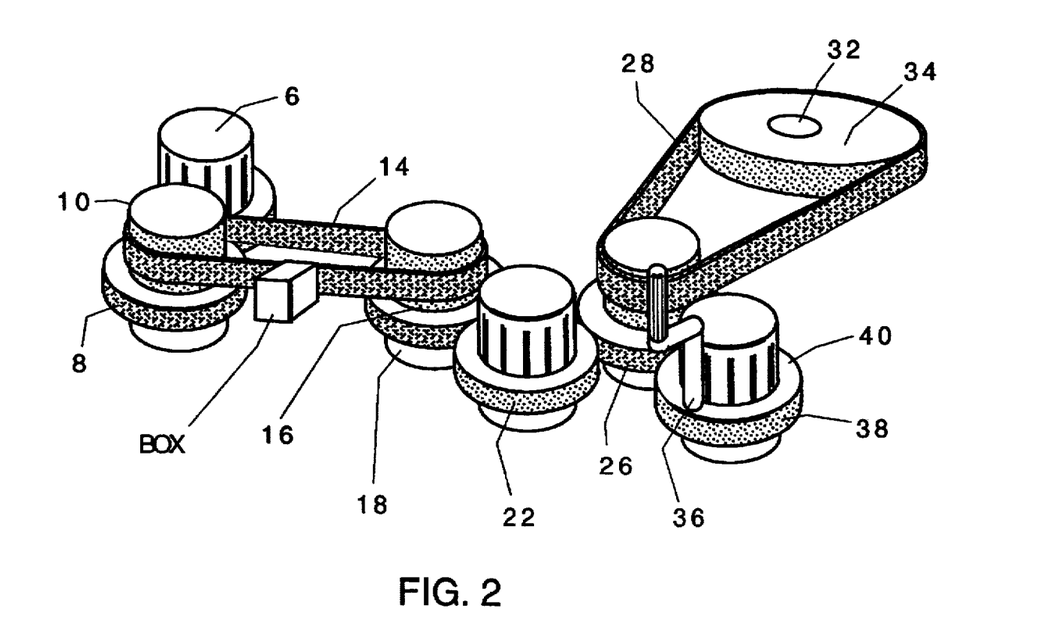
FIG. 2 depicts a side view of the same components shown in FIG. 1.
Figure 3:
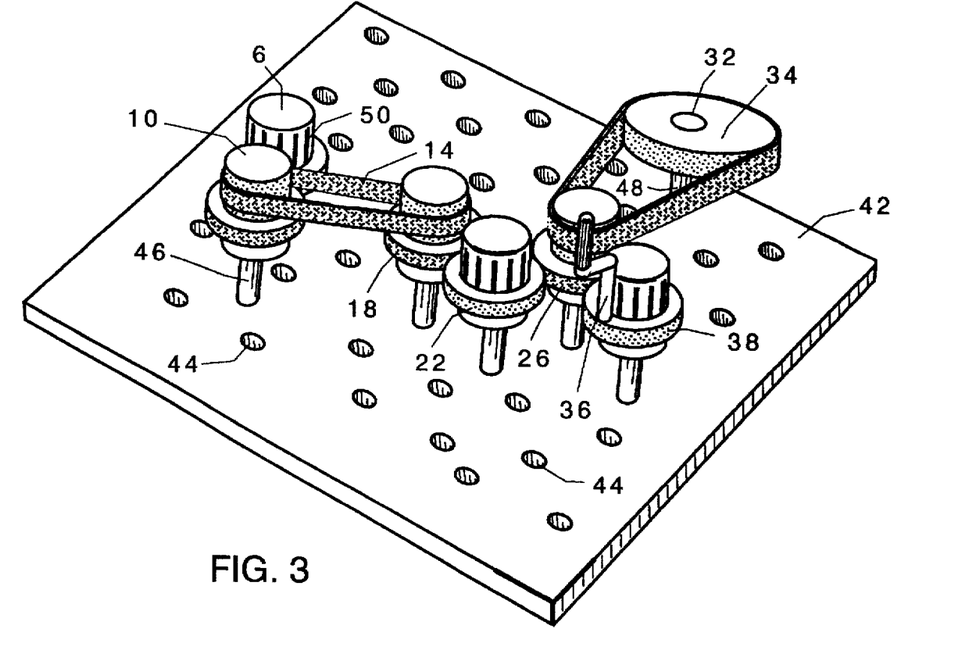
FIG. 3 depicts a side view of fritch and cam components as in FIG. 1 where the components have pivot rods for rotating and mounting in a board having apertures for receiving the pivot rods; further a belt having fritched areas encircles two R-fritches, and a belt having fritched areas encircles an R-fritch and a cam having fritched areas.
Figure 6:
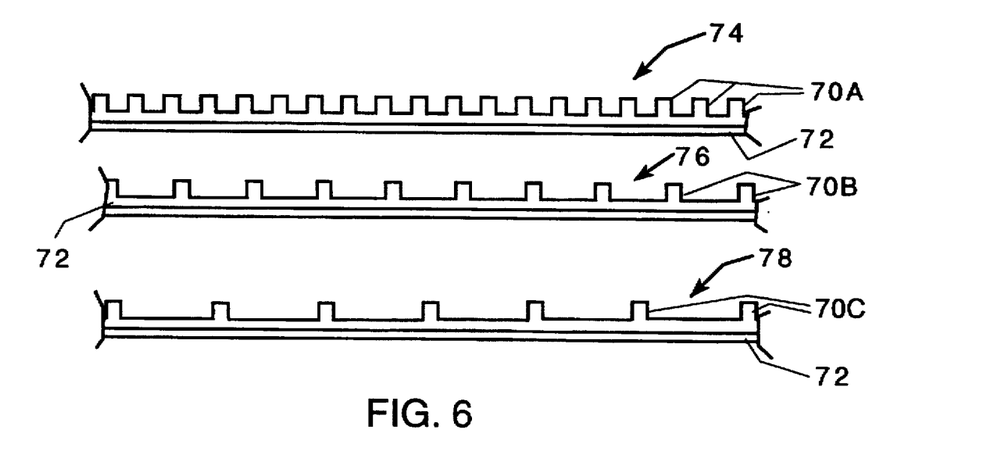
FIG. 6 depicts an enlarged cross-sectional view of three separate toothed tapes.
Figure 7A:
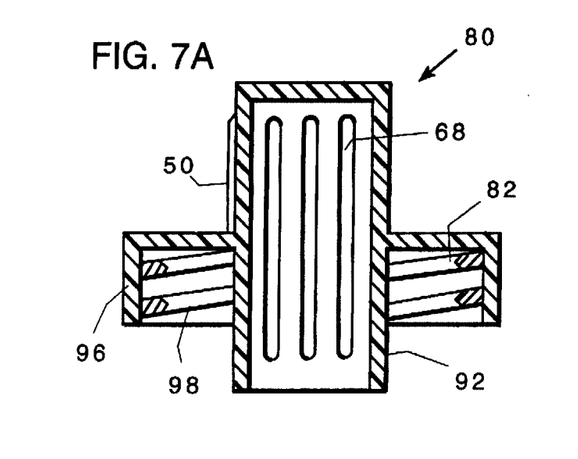
FIG. 7A depicts a cross-sectional view of a detergent cap having an expanded skirted region which has threading on its interior surface and having a hollow main body portion which extends above and below the skirted region; the main body portion has rib-like protrusions thereon.
Figure 7B:
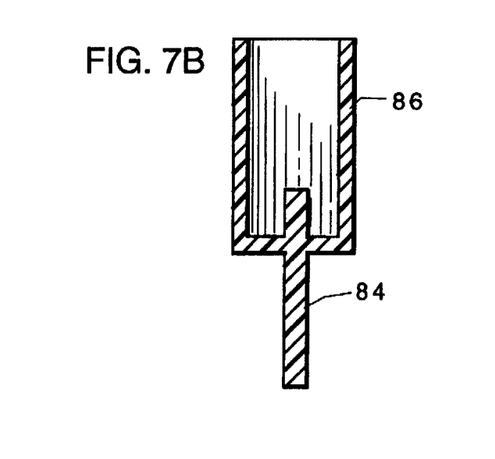
FIG. 7B depicts a cross-sectional view of a means for providing the detergent cap with a pivot rod.
Figure 7C:
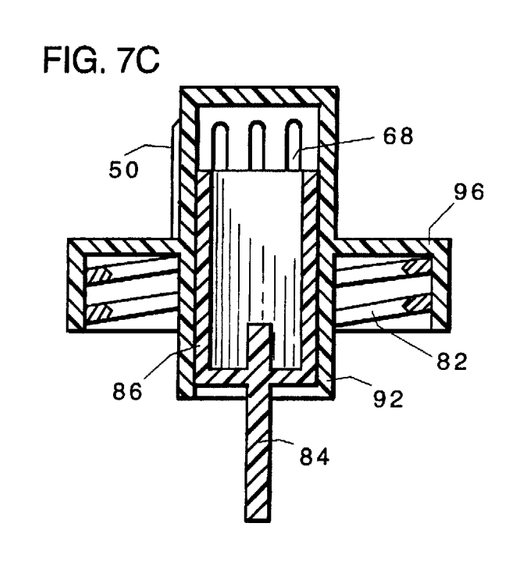
FIG. 7C depicts a cross-sectional view of a detergent cap of FIG. 7A with a means for providing a pivot rod mounted therein.
Figure 7D:
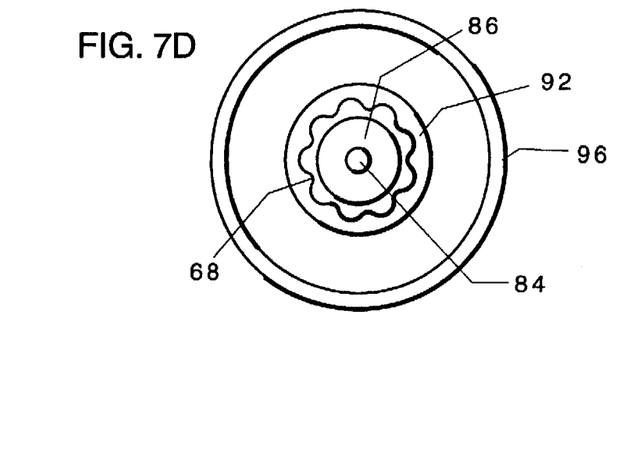
FIG. 7D depicts a top view of the bottle cap of FIG. 7A.

Fritches may be formed from plastic bottle caps such as are used on liquid detergent bottles such as, for example, those detergents known by the trademarked names WHISK, PUREX, CHEER, and ALL. Such bottle caps have a ribbed main body portion and a surrounding hollow skirt-like portion. However, oval plastic bottles caps such as those found on deodorants, for example MENNEN deodorant, are also useful, especially for forming cams. To form an R-fritch a band of a motion transfer surface is placed around the perimeter of the bottle cap and adhered thereto so as to prevent slippage of the band when the band engages another band. The band may be on an area of the tubular main body portion of the cap or it may be on the skirted portion of the cap or on both. Multiple bands may be present. Caps which have a circular perimeter and have motion transfer areas are called round fritches or R-fritches. Oval fritched caps are termed cam fritches or C-fritches. Spheres may also have a motion transfer surface area and thus form S-fritches. Blocks may also have fritched areas and are called B-fritches. And in all instants, the bands or fritched area may be interrupted by smooth non-fritched areas. Similarly, toothed ribbon such as illustrated in FIG. 6 may be used to form bands on caps, on cams, on spheres, and so on, thus forming gear-like structures for exploration of motion generated by fritch-tooth-surface interaction and for comparison of gear ratios. Of course, there may be other ways to form fritches such as on polygons and bevels FIGS. 1 to 3 show a set of R-fritches and a C-fritch, some of which engage fritched belts, which have been arranged on a board 42 having apertures. It is interesting to note that the width of the skirt 4 on the R-fritches is the same or nearly the same for all caps, large and small. Also common to these caps is a set of outer surface ribs 50 and a set of inner surface ribs 68. A first cap having a outer edge of a skirt 4 is provided with a first hooked surface 2 on that outer edge. A second R-fritch is formed from a second skirted bottle cap 10, where the outer edge of its skirt is provided with a first looped surface 8. Both the first cap and the second cap are also provided with hooked surfaces on the cap body portion (12 and 16 respectively) which extends above the skirt portion. A belt 14 having an interior and exterior surface, where at least the interior surface is looped, is placed relatively tautly around the first and the second cap so that the belt contacts at least a portion of the hooked surfaces 12 and 16. Similarly in FIG. 1, a belt 28 having a looped surface is mounted so as to contactingly engaged a hooked surface on a third R-fritch having a structure the same as the first cap and to contactingly engage an oval cap having a hooked surface and a cam top 34. The pivot point 32 which off center is also illustrated.

Further in FIG. 1, a fourth R-fritch engages the first cap's skirt at its skirt which bears a motion surface of a type opposite that of the first cap's. At its skirt 22, a fifth R-fritch engages the second R-fritch at its skirt 18 and the third R-fritch at its skirt 26. At its skirt 38, a sixth R-fritch which has a handle attached also engages the third R-fritch at its skirt 26. When the handle is rotated in a clockwise motion all the fritches and belts are caused to rotate in the direction shown by arrows in FIG. 1.

To further enhance the visual stimulation provided by the fritches and belts, each fritch may be brightly colored or have a design affixed to its top surface. Additionally, when the belt has motion transfer surfaces on both its interior and its exterior surface, objects can be detachably mounted on its exterior surface. A construction comprised of two R-fritches and a belt having motion transfer surfaces on both sides could be used to transport objects up and down a grade. Alternatively, two R-fritches placed on either side of a two-sided tape having two T-bar ends could be used to descend a height through the use of gravity as when escaping a burning building. The number of variations of design, color and fritch-belt placement which can be achieved by these construction elements is limited only by the imagination.

FIG. 2 shows the construction of FIG. 1 in perspective. In this figure bottle cap type 1 can be distinguished from bottle cap type 2 by the presence of paired ridges distributed on the upper exterior surface of bottle cap type 1. FIG. 2 further clarifies the placement of the motion transferring surfaces of FIG. 1.

FIG. 3 further illustrates the construction of FIG. 1 showing how the construction is mounted for rotation. Fritches having a pivot rod 46 or 48 which serves as an axis of rotation are shown seated in a board having apertures 42. As is illustrated, the pivot rod may be centered within the fritch 46 or placed off-center 48.

Figure 4:
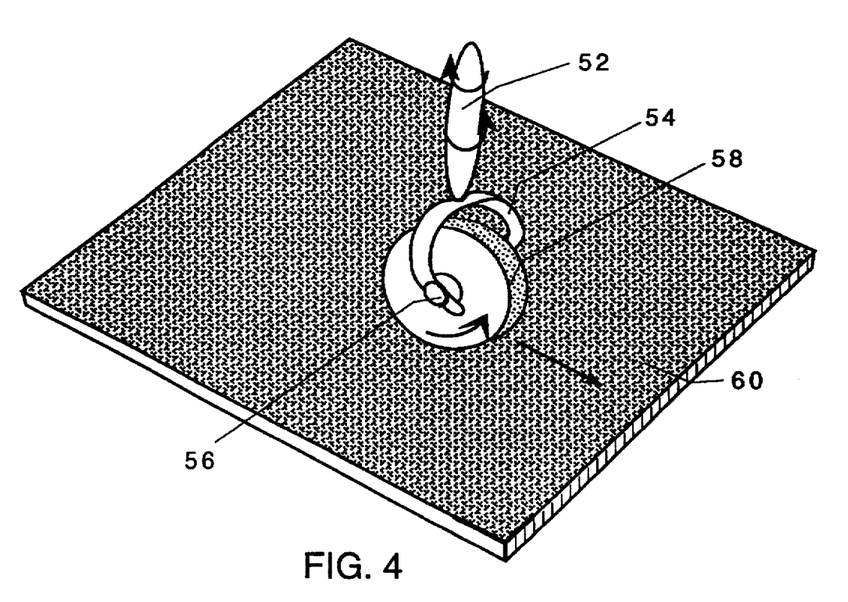
FIG. 4 depicts a perspective view of a R-fritch in contact with a planar fritched surface where the R-fritch has a pivot extending through an aperture in the fritch and where the pivot is mounted in a handle-like means which allows the R-fritch to rotate.

FIG. 4 illustrates another embodiment of the invention. An R-fritch having a center pivot rod 56 there through and a motion transfer surface on the outer perimeter of its skirted region 58 is mounted in a yoke 54 having an arm 52. The surface 58 is caused to contacting engage a planar motion transfer surface of an opposing type 60. When the R-fritch is rotated, the planar surface is caused to move in the opposite direction (as shown by arrows).

Figure 5:
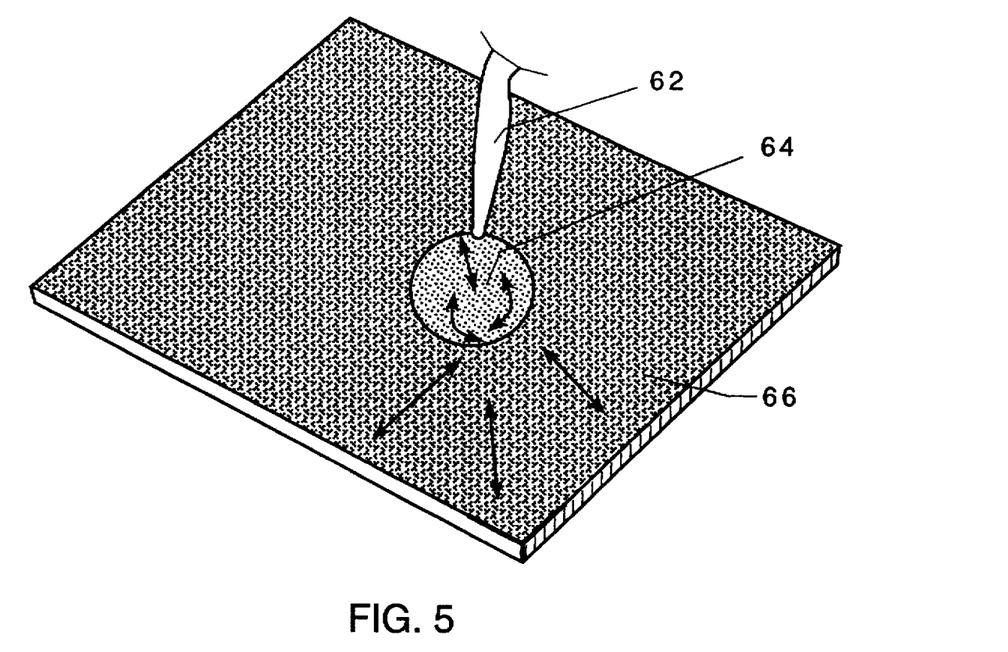
FIG. 5 depicts a perspective view of an S-fritch which is rotateably mounted on an arm and wherein the S-fritch is in contact with a planar fritched surface.

FIG. 5 illustrates an embodiment which utilizes an S-fritch 64 attached to an arm 62 for transferring motion to a planar surface 66. The planar surface can be caused to move in any direction. Both FIG. 4 and 5 show fritches being using to transfer motion with two linear degrees of freedom to a sheet.

FIG. 6 illustrates another embodiment of a motion transfer surface o toothed type. Three variations, 70A, 70B, and 70C, differing in the amount of space 74, 76, 78 between teeth, are shown. For example, the teeth 70A on the first tape are spaced such that three teeth occur on the first tape for every two teeth on the second tape. These toothed ribbons are made of a flexible material such as a plastic and can be adhesively applied to bottle caps through the use of an adhesive layer 72. Toothed shapes of this type are especially useful for studying gear sizes. Alternatively, fritches may sport more than one type of motion transfer surface to include having toothed areas.

FIGS. 7 A–C provides a method of forming fritches having a pivot rod. FIG. 7A illustrates the bottle cap which has a skirt 96 with threads 82 on its interior surface and which has series of ribs 68 on the interior surface of the body. FIG. 7D provides a top view to illustrate the placement of the ribs relative to the pivot rod 84 and to show a tube topper 92. FIG. 7B shows an engagement tube having a centered pivot rod 84 protruding therefrom. When the engagement tube is formed from a resilient, compressible material such as rubber, foam, or plastic, the engagement tube may be squeezeably forced into the interior of the main body of the fritch. Alternatively, an adhesive may be applied to the outer surface of the engagement tube before it is brought into contact with the fritch interior. In a method which is not illustrated, the cap may be inverted, filled with a material which will harden such as a resin and a pivot rod may be placed therein.

Figure 8:
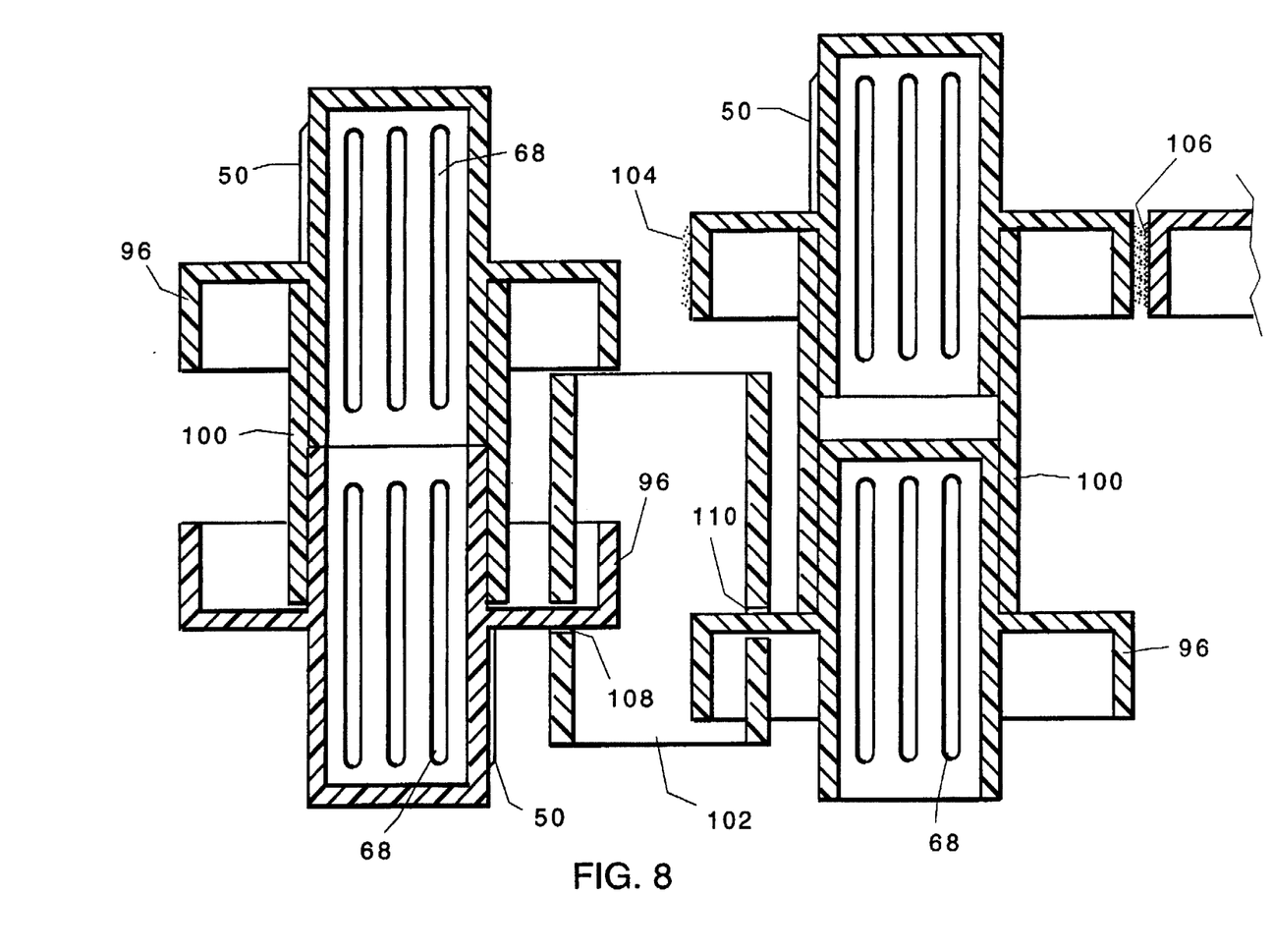
FIG. 8 depicts a cross-sectional view of R-fritches connected statically or rotationally with connector tubes.

FIG. 8 illustrate an embodiment which utilizes hollow tubes with 102 and without 100 slots 108, 110 for receiving a fritch. Fritches may be connected either statically or rotationally using these tubes. Two or more caps may be aligned top to bottom, top to bottom as is shown at the right side of FIG. 8 or fritches may be aligned top to bottom, bottom to top as illustrated in the left side of FIG. 8. Furthermore, the skirt of a fritch may be inserted into a tube as shown at 108 and at 110. Again, fritched areas, 104 and 106, are illustrated on the skirt edges. In this way building "blocks" which are stationary may be formed in addition to mobile fritches.

Figure 9:
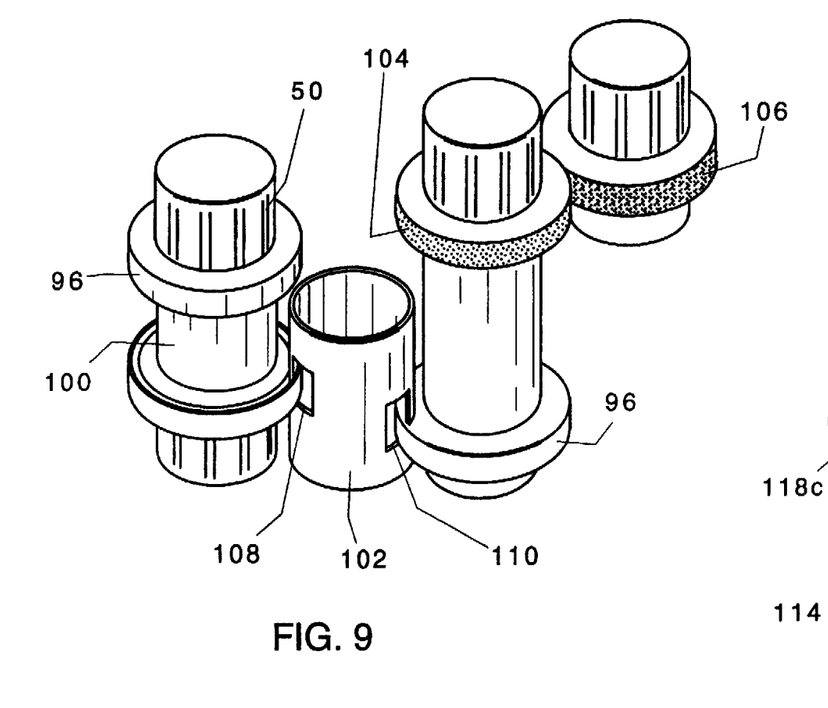
FIG. 9 depicts a side view of the R-fritches and connector tubes shown in FIG. 8.

FIG. 9 shows a side view of the construction described in FIG. 8.

Figure 10:
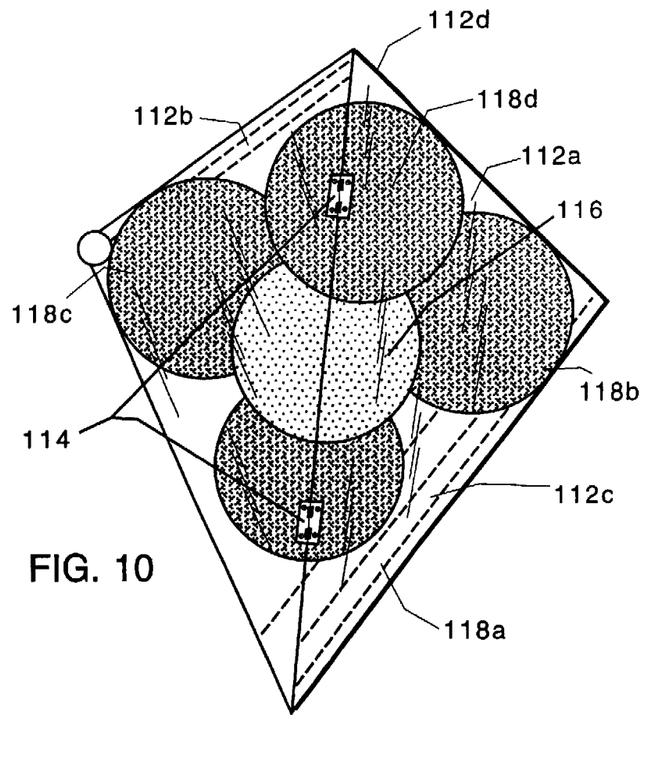
FIG. 10 depicts a top view of four S-fritches mounted in a transparent tetrahedral structure wherein at least one of the S-fritches has an activateable gyroscope mounted within its interior (not shown) and where the S-fritches contact at least one other S-fritch at least at one contact point.

FIG. 10 shows a transparent tetrahedral structure having a hinged side and which contains five S-fritches, at least one of which has a gyroscope or a stabilized flywheel within it. This embodiment illustrates a construction having three degrees of rotational freedom. The S-fritch 116 located in the center of the construction has a hooked surface and a gyroscope in its interior. The gyroscope can be a motorized flywheel having a switch activated by sound, such as the clapping of hands through a switch mechanism or by some other means such as a manual switch or a timer-activated switch. The four other S-fritches have loop napped surfaces. Rotation of the center fritch results in rotation of each other fritch as the central fritch engages it. The hinges 114 allow a side to be moved in order to rearrange the S-fritch relative positions. Patterns, colors, reflective surfaces and other visuals such as confetti can be added to enhance the construction.

Figure 11A:
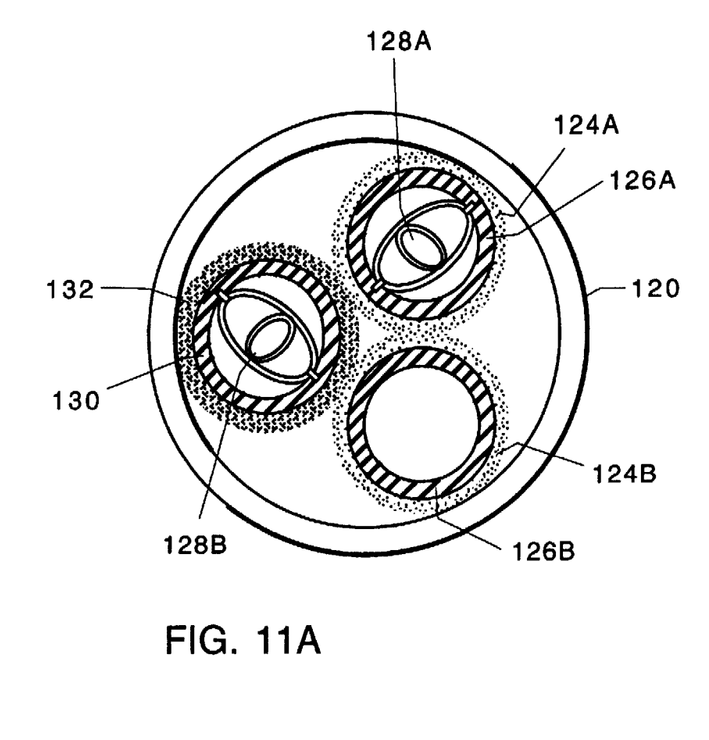
FIG. 11A depicts a cross-sectional view through a transparent ball having three S-fritches mounted in contact one with the other therein; two of the S-fritches are shown to have a gyroscope mounted in its interior.
Figure 11B:
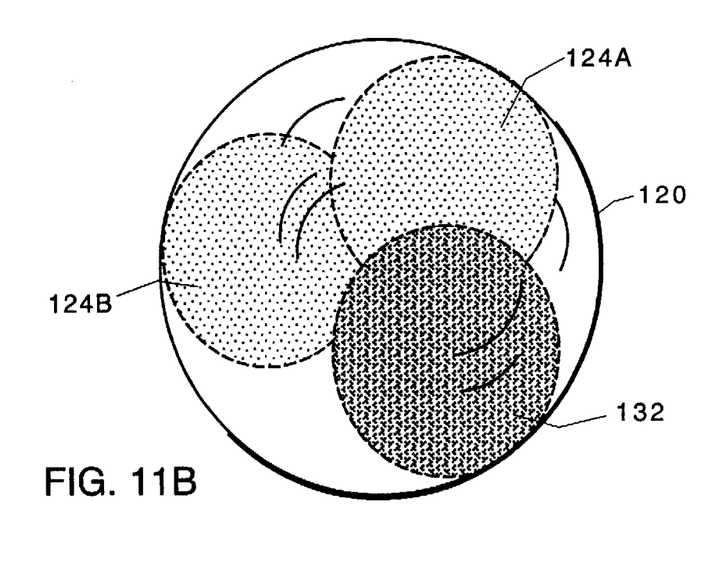
FIG. 11B depicts a perspective view of the of the ball shown in FIG. 11A.

FIGS. 11A-B illustrates an embodiment of a device exhibiting the transfer of motion with more than one degree of rotational freedom. FIG. 11A shows hollow balls within a transparent hollow sphere in cross-section. Each hollow ball has a smooth interior surface. The three balls within the outer ball shell 120 are S-fritches. Two of the S-fritches have activateable gyroscopes 128A and 128B seated within their hollow interiors which are enclosed by an inner ball shell 130 and 126A, respectively. Fritch surfaces 124A and 124B have loops. Fritch surface 132 has hooks. The S-fritches are spaced such that the surface of one does not necessarily contact the surface of another. When the transparent sphere becomes stabilized, rolling it over the ground will reorient the gyroscopes, and the inner balls will rotate trying to regain a stable configuration. FIG. 11B illustrates one possible range of motion which could be achieved by activating the gyroscopes.

By altering the types and locations of motion transferring surfaces, other interesting motion patterns may be generated and a variety of principles of physical science can be demonstrated. By altering the motion transfer surface used based upon the separation force required by varying the hook-like nap structure utilized or by varying the loop-like nap structure utilized or by varying both, the results of increasing tension of attachment on the amount of work required to move an object can be demonstrated. For example, the result of increasing weight on downward movement of an object due to gravity can be explored.

Figure 12:
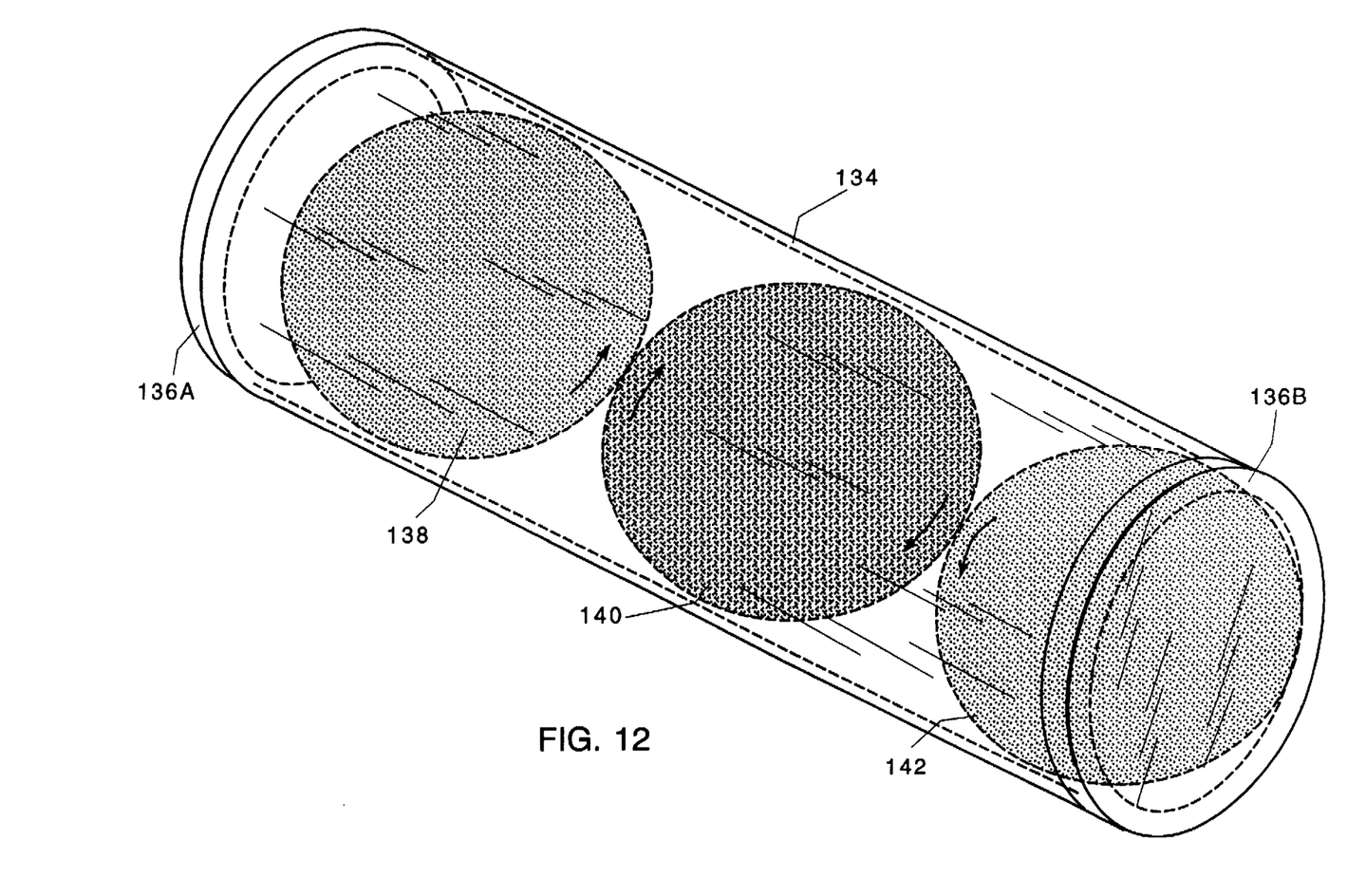
FIG. 12 depicts a side view of a transparent tubular structure having a closure at each end and further having three S-fritches seated therein; at least one S-fritch has an activateable gyroscope (not shown).

FIG. 12 illustrates possible variations on motion transfer patterns. Three S-fritches are shown in a hollow transparent tube having a closure means at each of the tube and further having a smooth interior surface. At least one of the S-fritches has a gyroscope located in its interior hollow chamber. Surface 138 has loops, surface 140 has hooks, and surface 142 has loops also. Movement of the center S-fritch results in movement of the S-fritches on each side of it.

Modifications and variations can be made to the disclosed embodiments without departing from the subject and spirit of the invention as defined in the following claims. Such modifications and variations, as included within the scope of these claims, are meant to be considered part of the invention as described.

What is claimed is:

1. A device for illustrating motion transfer comprising:
a hollow structure;
a first spherical object having a first exterior surface;
a first motion transfer surface on said first exterior surface of said first spherical object; and
a means for opening and closing said hollow structure, so that said first spherical object is securable within said hollow structure.

2. The device of claim 1 wherein said means for opening and closing is selected from the group consisting of a removable end, a movable side section, a hinged end, and a hinged side.

3. The device of claim 1 wherein said hollow structure is transparent.

4. The device of claim 1 further comprising a second spherical object and a second motion transfer surface on said second spherical object, wherein said hollow structure is transparent and said hollow structure causes said first spherical object to be in frictional contact with said second spherical object.

5. The device of claim 1 wherein said hollow structure is selected from the group consisting of a tube, a pyramid, and a sphere.

6. The device of claim 5 further comprising a gyroscope seated within said first spherical object.

7. The device of claim 6 wherein said gyroscope is activable by a wave having a frequency, said wave selected from the group consisting of sound waves and electronic waves.

8. The device of claim 7 further comprising a second spherical object having a second exterior surface and a second motion transfer surface on said second exterior surface.

9. The device of claim 8 further comprising a third spherical object having a third exterior surface and a third motion transfer surface on said third exterior surface.

10. The device of claim 8 wherein said first motion transfer surface and said second motion transfer surface are selected from the group consisting of a loop bearing surface, a hook bearing surface, and a smooth surface.

11. The device of claim 8 wherein said first motion transfer surface differs from said second motion transfer surface.

12. The device of claim 8 wherein said hollow structure is transparent and said hollow structure causes said first spherical object to be in frictional contact with said second spherical object.

13. A tape for forming gears comprising:
a flexible ribbon substrate having a first side and a second side;
a plurality of ridges having a height protruding from said first side of said substrate, said ridges being spaced one from the other by smooth areas having a length; and
a smooth surface on said second side of said substrate.

14. The tape of claim 13 having a first edge and a second edge wherein said ridges from said first edge to said second edge and said smooth areas extend from said first edge to said second edge.

15. The tape of claim of claim 14 further comprising an adhesive on said smooth surface.

16. The tape of claim 14 wherein said ridges form teeth.

17. The tape of claim of claim 16 further comprising an adhesive on said smooth surface.

* * * * *